US011951707B2

(12) United States Patent
Tale' et al.

(10) Patent No.: US 11,951,707 B2
(45) Date of Patent: Apr. 9, 2024

(54) MACHINE AND METHOD FOR PRODUCING A TUBULAR PRODUCT, PREFERABLY MADE OF PAPER, PREFERABLY USABLE TO PRODUCE STRAWS

(71) Applicant: I.M.A. INDUSTRIA MACCHINE AUTOMATICHE S.P.A., Ozzano Dell'Emilia (IT)

(72) Inventors: Fabrizio Tale', Ozzano Dell'Emilia (IT); Fiorenzo Draghetti, Ozzano Dell'Emilia (IT); Federico Zanettin Misley, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 39 days.

(21) Appl. No.: 17/926,245

(22) PCT Filed: May 13, 2021

(86) PCT No.: PCT/IT2021/050144
§ 371 (c)(1),
(2) Date: Nov. 18, 2022

(87) PCT Pub. No.: WO2021/234745
PCT Pub. Date: Nov. 25, 2021

(65) Prior Publication Data

US 2023/0241858 A1 Aug. 3, 2023

(30) Foreign Application Priority Data

May 18, 2020 (IT) ........................ 102020000011344

(51) Int. Cl.
*B31D 5/00* (2017.01)
*B31C 3/00* (2006.01)
*B65H 81/08* (2006.01)

(52) U.S. Cl.
CPC .............. *B31D 5/0095* (2013.01); *B31C 3/00* (2013.01); *B65H 81/08* (2013.01)

(58) Field of Classification Search
CPC ............................... B31D 5/00; B31D 5/0095; B31D 2205/0064; B31D 2205/007; B31C 3/00;
(Continued)

(56) References Cited

U.S. PATENT DOCUMENTS 2,035,320 A * 3/1936 Kniesche .................. B31C 3/00 493/298
2,250,430 A * 7/1941 Wade ........................ B31C 3/00 156/431

(Continued)

FOREIGN PATENT DOCUMENTS

JP S4934016 3/1974
JP 49073823 U * 6/1974
JP S4973823 6/1974

OTHER PUBLICATIONS

International Search Report and Written Opinion corresponding to International Patent Application No. PCT/T2021/050144, dated Sep. 8, 2021.

*Primary Examiner* — Jacob A Smith
(74) *Attorney, Agent, or Firm* — MCANDREWS HELD & MALLOY, LTD

(57) ABSTRACT

A machine (10) and a method for producing a tubular product (A), preferably made of paper, which can be preferably used to produce straws starting from one or more strip-shaped elements (B), by means of winding means (17) configured in a closed loop and partly wound around a shaping member (12) on which the one or more strip-shaped elements (B) are wound in a helical manner and by means of support means (20) configured as a support belt (22)
(Continued)

disposed in a closed loop, made of flexible material, partly wound on the shaping member (12).

19 Claims, 5 Drawing Sheets

(58) Field of Classification Search
CPC .. B31C 11/00; B31C 1/00; B31C 5/00; B31C 1/08
USPC .......................................................... 493/299
See application file for complete search history.

(56) References Cited

U.S. PATENT DOCUMENTS 2,983,616 A * 5/1961 Levi .......................... B31C 3/00
156/190
3,291,009 A * 12/1966 Davis ................... B31D 5/0095
83/593

* cited by examiner

MACHINE AND METHOD FOR PRODUCING A TUBULAR PRODUCT, PREFERABLY MADE OF PAPER, PREFERABLY USABLE TO PRODUCE STRAWS

FIELD OF THE INVENTION

The present invention concerns a machine and a method for producing a tubular product, preferably made of paper, which can preferably be used to produce straws, by helically winding one or more strip-shaped elements of flexible material, preferably paper, partly superimposed one on top of the other, around a shaping member having a substantially cylindrical shape.

BACKGROUND OF THE INVENTION

Machines and methods are known for the automated production of tubular products using paper, or materials similar to it, as raw material, from which drinking straws can then be obtained, for example by the spiral winding, on a shaping member, also called mandrel, or pin, of one or more strip-shaped elements, consisting of ribbons, strips or filaments of paper, with a technique that is known to those skilled in the art by the English term of "filament winding". Examples of such machines which produce tubular paper products by the spiral winding of a plurality of strip-shaped elements, and which after shaping are automatically cut to make straws of determinate lengths, are described in patent documents U.S. Pat. No. 2,212,915, US-A1-2007/010387, U.S. Pat. No. 3,291,009, JP-A-S4934016, JP-U-S4973823 and U.S. Pat. No. 3,327,596.

The pin, along its longitudinal development, has two portions, a first portion associated with first support means, and a second portion, opposite the first, preferably disposed cantilevered with respect to the first support means.

In the state of the art, the helical winding of the one or more strip-shaped elements around the pin is obtained by means of first drive means, or motors, preferably a pair of opposite motors, configured to drive winding means, for example a belt closed in a loop and partly wound around the pin.

In these machines, the production capacity of straws is proportional to the winding speed of the strip-shaped elements around the pin, which indicatively varies according to the size of the straw, and ranges from 2,000 to 8,000 rpm.

The movement of the winding means causes the helical winding of the strip-shaped elements around the pin, applying a traction force substantially tangent and inclined by a certain angle with respect to the longitudinal axis of the pin. The consequence is a first component, parallel to the longitudinal axis, which carries out the helical winding of the strip-shaped elements, and a second component, in a direction perpendicular to the longitudinal axis, which tends to flex the pin.

The flexion of the pin can cause imperfections and defects in the tubular product being shaped, making it in practice unusable for subsequent processing or use.

One disadvantage is that in such known machines the rotation speed of the winding means must be limited to prevent the flexion of the pin, an aspect that compromises the achievement of high productivity.

Considering that the pin has a small diameter and has a length equal to up to hundreds of times the diameter, the high number of revolutions at which it could be made to rotate would cause, in particular in correspondence with the second cantilevered portion, a deviation of the longitudinal axis due to the influence of the traction force exerted by the winding means.

There is therefore a need to perfect a machine for making a tubular product, preferably made of paper, which can be preferably used to produce straws, which can overcome at least one of the disadvantages of the state of the art.

One purpose of the present invention is to provide a machine which allows to increase the productivity of the tubular product so as to provide more material for the production of straws.

Another purpose of the invention is to provide a machine able to make a tubular product that has a high production quality.

Another purpose of the present invention is to provide a machine with limited overall size.

Another purpose is to provide a machine that is easy and economical to maintain.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, there is supplied a machine for producing a tubular product, preferably made of paper, which can be preferably used to produce straws starting from one or more strip-shaped elements.

The machine according to the present invention comprises a shaping member with a substantially cylindrical oblong shape and having a longitudinal axis. The shaping member comprises a first portion configured to be directly associated with first support means, and a second portion disposed at a free end of the shaping member, on the opposite side with respect to the first support means. The shaping member is configured to allow one or more strip-shaped elements to be wound around it to produce the tubular product.

The machine according to the present invention also comprises winding means configured in a closed loop and partly wound around the shaping member in a first intermediate position of the latter, between the first and second portion as above. In this way, it is possible to carry out the helical winding of the one or more strip-shaped elements around the shaping member and their drawing in a shaping direction, applying a determinate first traction force substantially tangent to the shaping member and inclined by a determinate angle with respect to the longitudinal axis. The first traction force generates a consequent first component, parallel to the longitudinal axis, which carries out the helical winding of the one or more strip-shaped elements and a second component, in a direction perpendicular to the longitudinal axis, which tends to flex the shaping member.

In accordance with one aspect of the present invention, the machine also comprises second support means comprising a support belt disposed in a closed loop, made of flexible material, only partly wound on the shaping member and configured to support the shaping member in a second intermediate position, positioned downstream of the first intermediate portion with respect to the shaping direction of the tubular product. The support belt is configured to apply an additional force on the shaping member, in the second intermediate position, in contrast to the second component of the first traction force without drawing the one or more strip-shaped elements as above, so as to keep the shaping member substantially coaxial to the longitudinal axis and at the same time letting the strip-shaped elements slide on the support belt.

According to the invention, by configuring the second support means so that they supply a suitable second force, it is possible to increase the rotation speed of the winding means up to speeds that cannot be reached by the machines of the state of the art, while limiting, or even eliminating, the phenomena of flexion induced by the action of the motion transmission means.

According to one aspect of the invention, the support belt is made of a material having a lower friction coefficient than that of the material used to make the winding means.

According to one aspect of the invention, the machine also comprises first drive means, comprising for example two electric motors, disposed on opposite sides with respect to a first work plane on which the longitudinal axis of the shaping member lies. The first drive means are configured to rotate the winding means, for example a belt, which is closed in a loop and flexible. In accordance with one possible embodiment, the electric motors comprise, in particular, a main electric motor and an auxiliary electric motor, which can possibly assist the main electric motor to rotate winding means as above.

The first drive means can comprise respective pulleys which rotate on corresponding axes of rotation parallel to each other and belonging to a plane parallel to a second work plane which orthogonally intersects the first work plane as above along the longitudinal axis of the shaping member.

Another advantage of the disposition of the first drive means described above is that in this way the winding means are prevented from not twisting in the proximity of the shaping member, reducing the generation of possible vibrations that could cause the shaping member to oscillate.

Furthermore, this solution makes the shaping member more stable, enhancing the effect of the second support means, since the greater stability of the shaping member allows the support belt to not lose contact with the one or more strip-shaped elements and the shaping member.

Furthermore, compared to known solutions, the machine thus configured has a reduced horizontal overall size, thus allowing to save space, allowing it to be used even in environments that are not very spacious or are occupied by other machinery.

Advantageously, this disposition considerably reduces the overall size of the first drive means, allowing to produce a machine with reduced overall sizes and more easily confinable within a structure.

This can allow to produce the tubular product in a protected, clean and controlled environment, conditions that substantially allow to isolate this operation from the external environment, limiting possible contamination of dust or germs. In this way, it is possible to supply a safer product, especially in the food sector or in cases where particular operating conditions are required.

In accordance with another characteristic aspect of the present invention, the second support means, configured as the support belt as above, can be configured to apply a third or additional force, or contrast force, on the shaping member in correspondence with the second intermediate position.

In accordance with another characteristic aspect of the present invention, the third force has at least one component opposite, in direction and sense, with respect to the second component of the first traction force.

In accordance with another characteristic aspect of the present invention, the support belt is configured to apply a third traction force substantially tangent to the shaping member and inclined by a determinate angle with respect to the longitudinal axis, which generates a consequent third force as above.

In accordance with another characteristic aspect of the present invention, the support belt is associated with one or more rotation means which provide one or more rotation points around which the support belt can rotate.

In accordance with another characteristic aspect of the present invention, the one or more rotation means are positioned in a concordant manner with respect to a first work plane on which the longitudinal axis lies.

In accordance with another characteristic aspect of the present invention, the one or more rotation means lie on a second work plane that orthogonally intersects the first work plane in correspondence with the longitudinal axis of the shaping member.

In accordance with another characteristic aspect of the present invention, the one or more rotation means are associated with second drive means configured to be rotated.

In accordance with another characteristic aspect of the present invention, the second drive means are configured to rotate the support belt with a direction and speed concordant with the rotation and speed of the winding means.

In accordance with another characteristic aspect of the present invention, the first and the second intermediate positions are distanced by a length that is kept as small as possible in order to prevent the onset of torque. In particular, this length is smaller than the distance between the first support means and a contact portion of the winding means with the shaping member.

In accordance with another characteristic aspect of the present invention, the winding means comprise a flexible drawing belt, closed in a loop, and having friction coefficient higher than the friction coefficient of the support belt. The drawing belt is disposed and configured to draw the strip-shaped elements in the shaping direction as above.

In accordance with the purposes of the invention, the second support means allow to increase the hourly production capacity of the machine while maintaining high quality standards of the product.

Another advantage of the present invention is given by the fact that by limiting, or even eliminating, the inflection of the shaping member, it is possible to reduce or eliminate malfunctions or jams.

It is evident that if the shaping member inflects, it can wear out prematurely and it can be necessary to replace it frequently, resulting in high maintenance costs and long periods of machine downtime.

Another advantage of the present invention is achievable thanks to the fact that, by preventing the inflection of the shaping member, the tubular product is formed exactly on the winding axis, preventing unwanted twisting that causes problems in the management of the subsequent work steps.

The present invention also concerns a method to produce a tubular product, preferably made of paper, which can be preferably used to produce straws starting from one or more strip-shaped elements. In particular, the method comprises:

feeding one or more strip-shaped elements, preferably made of paper, in a shaping direction, onto a shaping member, winding the one or more strip-shaped elements around the shaping member by rotating winding means wound on the shaping member, applying a determinate first traction force that generates a first component suitable to wind the one or more strip-shaped elements and a second component which tends to flex the shaping member.

According to one aspect of the invention, the method also comprises supporting, during the winding of the one or more strip-shaped elements, the shaping member by means of second support means configured as a flexible support belt closed in a loop, partly wound on the shaping member, wherein the support belt applies an additional force on the shaping member in contrast to the second component of the first traction force as above, without drawing the strip-shaped elements, so as to keep the shaping member substantially coaxial to the longitudinal axis and at the same time letting the strip-shaped elements slide on the support belt.

In accordance with another characteristic aspect of the present invention, the method also comprises rotating the support belt by exerting a friction on the strip-shaped elements that is less than that exerted by the winding means.

In accordance with another characteristic aspect of the present invention, the third force has at least one component opposite, in direction and sense, with respect to the second force.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
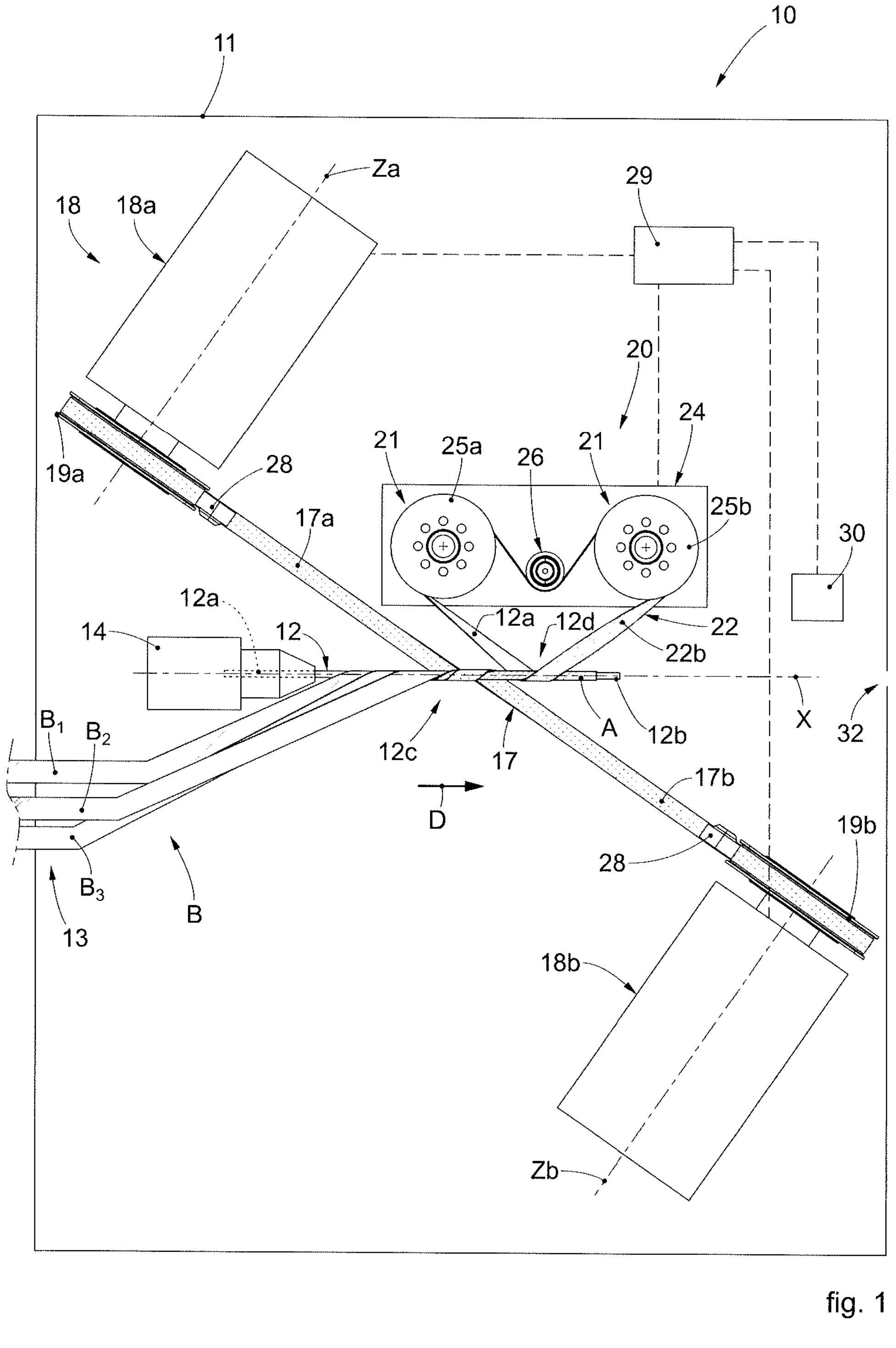
FIG. 1 is a lateral view of a machine in accordance with the embodiments described.

We must clarify that in the present description and in the claims terms such as vertical, horizontal, lower, upper, right, left, high, low, front and rear, with their declinations, have the sole function of better illustrating the present invention with reference to the drawings and must not be in any way used to limit the scope of the invention itself, or the field of protection defined by the claims. For example, with the term vertical we mean an axis, or a plane, that can be either perpendicular to the line of the horizon, or inclined, even by several degrees, for example up to 20°, with respect to such perpendicular position.

Furthermore, the person of skill in the art will recognize that certain sizes, or characteristics, in the drawings may have been enlarged, deformed, or shown in an unconventional or non-proportional manner in order to provide a version of the present invention that is easier to understand. When sizes and/or values are specified in the following description, the sizes and/or values are provided solely for illustrative purposes and must not be considered as restrictive factors with regard to the field of protection of the present invention, unless such sizes and/or values are present in the attached claims.

DETAILED DESCRIPTION OF SOME EMBODIMENTS OF THE PRESENT INVENTION

We will now refer in detail to the various embodiments of the present invention, of which one example is shown in the attached drawings. This example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 2:
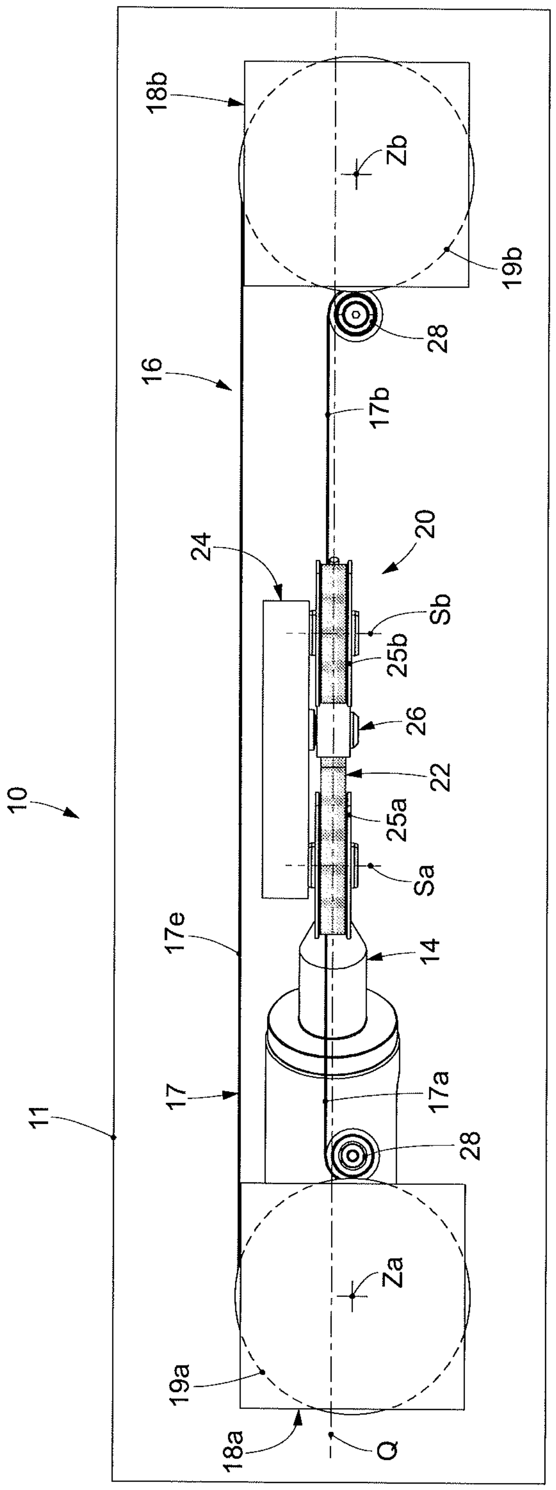
FIG. 2 is a top view of a machine in accordance with the embodiments described.
Figure 3:
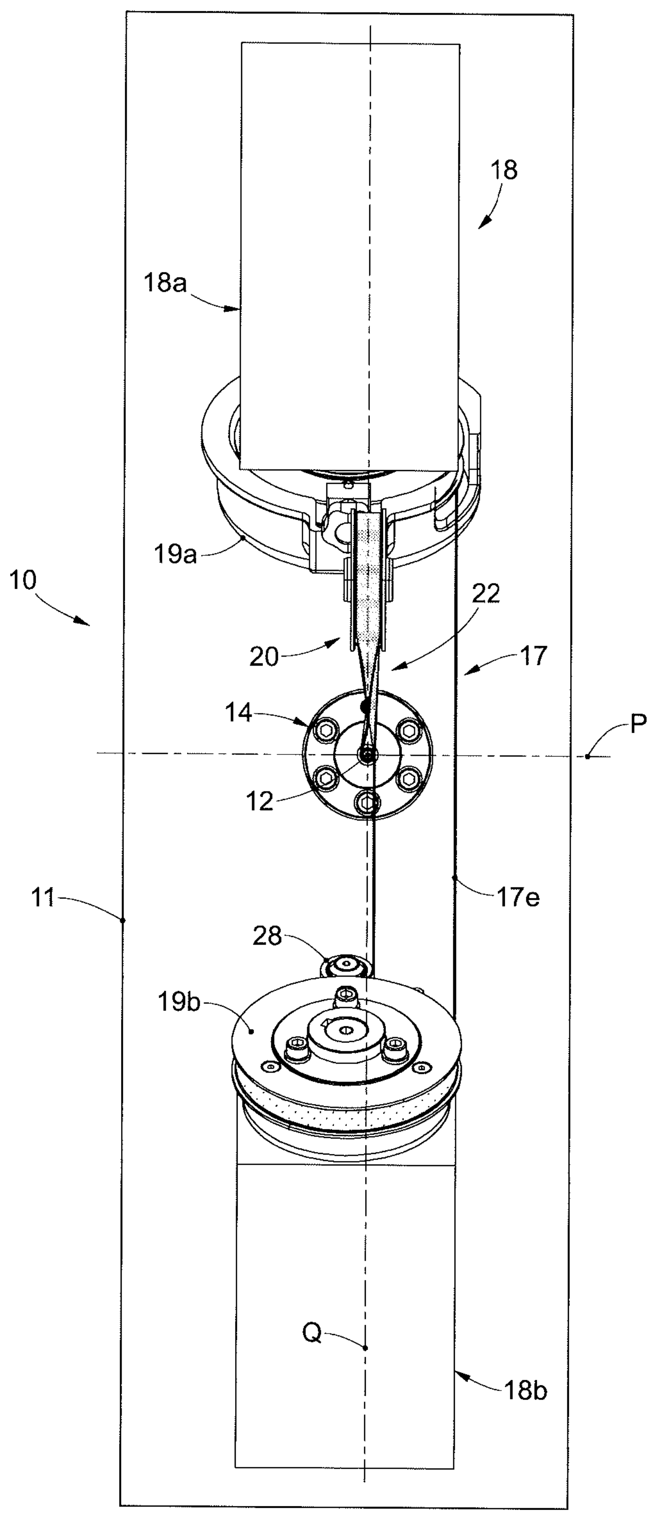
FIG. 3 is a front view of a machine in accordance with the embodiments described.

With reference to FIGS. 1, 2 and 3, there is shown a machine 10 according to the present invention for producing a tubular product A, preferably made of paper, which can be preferably used to produce straws starting from one or more strip-shaped elements B, preferably strips of paper, each having, for example, a thickness comprised between about 0.05 mm and about 0.2 mm and a width comprised between about 5 mm and about 20 mm.

The one or more strip-shaped elements B, in the example case the strip-shaped elements B1, B2, B3, have on at least one surface along their longitudinal development a layer of adhesive material (not shown) suitable to make the strip-shaped elements B adhere to each other.

The adhesive material can be advantageously disposed in correspondence with the portions of strip-shaped element that are superimposed with each other.

With reference to FIG. 1, the machine 10 comprises an external frame or structure 11, inside which the parts or components, described below, suitable to shape the tubular product A, are installed.

The frame 11 can be provided with an inlet 13 into which the one or more strip-shaped elements B can be fed, and an outlet 32 from which the tubular product A can exit.

The machine also comprises a shaping member 12, for example consisting of a pin, preferably made of metal, having a substantially cylindrical oblong shape and a longitudinal axis X.

To better understand the present invention, the pin that constitutes the shaping member 12 is very thin and, for example, has a diameter comprised between about 2 mm and about 8 mm and a length comprised between about 100 mm and about 300 mm.

The shaping member 12 is configured to allow the winding of the one or more strip-shaped elements B around it to produce the tubular product A.

The shaping member 12 comprises a first portion 12*a*, configured to be supported by first support means 14, and a second portion 12*b*, disposed cantilevered with respect to the first support means 14.

The machine also comprises winding means 17 configured in a closed loop and partly wound around the shaping member 12 in a first intermediate position 12*c* of the latter, between the two portions 12*a* and the terminal end of the second cantilevered portion 12*b*. In this way, it is possible to carry out the winding of the one or more strip-shaped elements B in a helical manner around the shaping member 12, in a shaping direction D, by applying a determinate first traction force T1 substantially tangent to the shaping member 12 and inclined by a determinate angle $\alpha$ with respect to the longitudinal axis X (FIG. 4).

Figure 4:
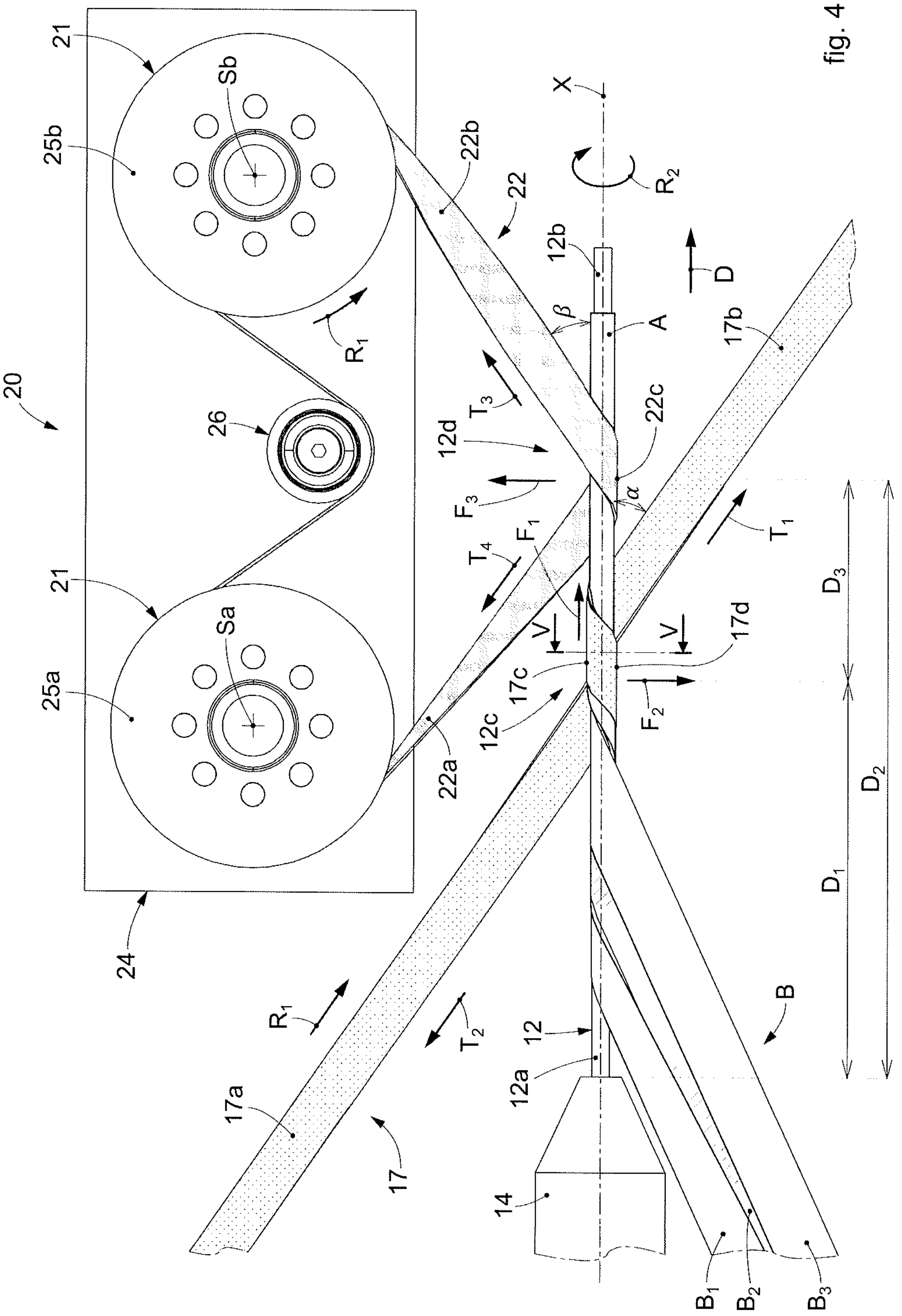
FIG. 4 is a rear view of a detail of a machine in accordance with the embodiments described.

As can be seen in FIG. 4, the first traction force T1 generates a consequent first component F1, parallel to the longitudinal axis X, which carries out the helical winding of the one or more strip-shaped elements B and a second component F2, in a direction perpendicular to the longitudinal axis X, which tends to flex the shaping member 12.

According to one aspect of the invention, the machine 10 also comprises second support means 20 configured to support the shaping member 12 in a second intermediate position 12*d* of the latter so as to at least partly contrast the second component F2 of the first traction force T1. The second intermediate position 12*d* is interposed between the first intermediate position 12*c* and the terminal end of the second cantilevered portion 12*b*.

According to the purposes of the invention, the solution allows to keep the shaping member 12 substantially coaxial to the longitudinal axis X despite the application of the first traction force T1 by the winding means 17.

The machine 10 also comprises first drive means 18, which comprise, for example, two electric motors 18*a* and 18*b*, in particular a main electric motor 18*b* and an auxiliary electric motor 18*a*, which are disposed on opposite sides with respect to a first work plane P on which the longitudinal axis X of the shaping member 12 lies. The two electric motors 18*a* and 18*b* are configured to rotate the winding means 17, for example a belt, closed in a loop and flexible (FIGS. 1, 2 and 3).

With reference to FIGS. 1, 2 and 3, with the two electric motors 18*a*, 18*b* there are associated two respective pulleys 19*a*, 19*b* which rotate on corresponding axes of rotation Za and Zb parallel to each other and lying on a plane parallel to a second work plane Q which orthogonally intersects the first work plane P along the longitudinal axis X of the shaping member 12.

Another advantage of the disposition of the first drive means 18 described above, visible, in particular, in FIG. 4, is that this allows the winding means 17 to not twist in the proximity of the shaping member 12, reducing the generation of possible vibrations that could cause the shaping member 12 to oscillate.

This solution makes the shaping member 12 more stable, enhancing the effect of the second support means 20 since the greater stability of the shaping member 12 allows the support means 20 to not lose contact with the shaping member 12.

Furthermore, compared to known solutions, the machine 10 thus configured has a reduced horizontal overall size, which can be appreciated from FIGS. 2 and 3, thus allowing it to be more compact, allowing its use even in environments that may be not very spacious or occupied by other machinery.

The second support means 20 can be configured to apply a third or additional force F3, or contrast force, on the shaping member 12 in correspondence with the second intermediate position 12*d*.

In accordance with some embodiments, the third force F3 has at least one component opposite, in direction and sense, with respect to the second force F2 of the first traction force T1.

In accordance with the purposes of the invention, the third force F3 has an intensity substantially equivalent to that of the second force F2, so that the resultant of the forces applied on the shaping member 12 is substantially equal to zero.

The second support means 20 comprise a support belt 22 configured in a closed and flexible loop that can be partly wound on the shaping member 12.

For example, it is provided that the support belt 22 is partly wound around the shaping member 12 in correspondence with the second intermediate position 12*d* (FIGS. 1 and 4).

The support belt 22 can apply a third or further traction force T3 substantially tangent to the shaping member 12 and inclined by a determinate angle β with respect to the longitudinal axis X, which generates the third force F3 (FIG. 4), as a component of the same third traction force T3.

Through this solution, the flexion of the shaping member 12 is reduced or even eliminated, allowing the second portion 12*b* to also rotate in axis with the longitudinal axis X.

In this way, by configuring the support means 20 to supply a suitable third force F3, it is possible to increase the rotation speed of the winding means 17, and consequently of the strip-shaped elements B, up to a value of about 10,000 rpm, which is difficult to reach with the machines of the state of the art, because the flexion phenomena induced by the second force F2 are reduced and almost canceled.

In accordance with the purposes of the invention, the second support means 20 allow to increase the hourly production capacity of the machine 10 while maintaining high quality standards of the tubular product A.

The support belt 22 can be associated with one or more rotation means 21 which provide respective one or more rotation points around which the support belt 22 can rotate.

The support belt 22, during use, at least partly contacts the one or more strip-shaped elements B wound around the shaping member 12.

The support belt 22 can be allowed to rotate, so as to follow, at least partly, the rotary motion of the winding means 17, and consequently of the strip-shaped elements B in order to limit the friction phenomena that can be generated in the second intermediate position 12*d* between the strip-shaped elements B and the support belt 22, which could possibly damage, for example unthread, the tubular product A.

In fact, advantageously, the material with which the support belt 22 is made has a lower friction coefficient than that of the material with which the winding means 17 are made. By way of a non-limiting example, the support belt 22 can have a friction coefficient lower than 0.1, and the winding means 17 can have a friction coefficient higher than 0.2.

This advantageously allows to let the one or more strip-shaped elements B slide on the support belt 22 while these elements are wound in a helical manner around the shaping member 12 by the winding means 17.

With reference to FIG. 3, the one or more rotation means 21 can be positioned in a concordant manner with respect to the first work plane P.

The one or more rotation means 21 can lie on the second work plane Q which orthogonally intersects the first work plane P in correspondence with the longitudinal axis X of the shaping member 12 (FIGS. 2 and 3).

It is provided that the one or more rotation means 21 are associated with second drive means 24, for example electric motors, configured to rotate the support belt 22 (FIGS. 1, 2 and 4).

Advantageously, in this way, the support belt 22 can be made to rotate by driving the second drive means 24, at a speed which can substantially match the rotation speed of the winding means 17.

Preferably, the rotation means 21 can be two pulleys 25*a* and 25*b* (FIGS. 1, 2 and 4).

The pulleys 25*a* and 25*b* can be disposed so that their respective axes of rotation Sa and Sb are orthogonal to the longitudinal axis X of the shaping member 12.

Furthermore, each of the pulleys 25*a* and 25*b* can lie, with respective axes of rotation Sa and Sb, parallel to each other, on a same plane parallel to the first work plane P, or to the second work plane Q.

In other possible embodiments, not shown, the axes of rotation Sa and Sb of the pulleys 25*a* and 25*b* can also be oriented in a different manner, according to completely equivalent configurations and all coming within the scope of the present invention.

Alternatively, the pulleys 25*a* and 25*b* can be positioned on opposite sides with respect to the second work plane Q, with the axes of rotation Sa and Sb parallel to the shaping member 12.

In accordance with some embodiments, the pulleys 25*a*, 25*b* can be associated with the second drive means 24 configured to rotate them. Optionally, each pulley can be associated with respective second drive means 24 (not shown).

According to some embodiments, the second support means 20 can be provided with tensioning means 26 suitable to keep the support belt 22 in the correct tension (FIGS. 1, 2 and 4).

Referring to FIGS. 1 and 2, in order to wind around the shaping member 12, the support belt 22 intersects the first work plane P, partly winding around the shaping member 12, contacting it, and ideally dividing itself into two portions, or branches, 22*a* and 22*b* respectively afferent to the pulley 25*a* and 25*b*.

In accordance with some embodiments, the branches 22*a* and 22*b*, at least in correspondence with the shaping member 12, are opposite with respect to the second work plane Q.

Figure 5:
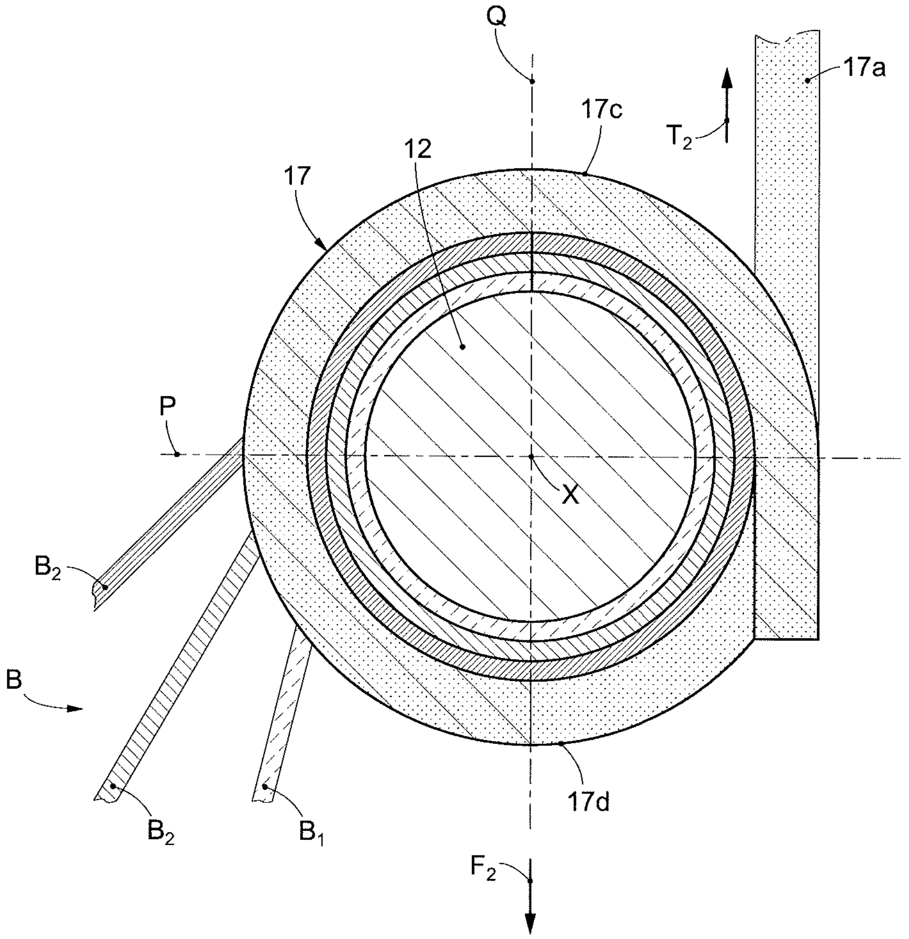
FIG. 5 is a section view taken along section line V-V of FIG. 4.

With reference to FIGS. 1, 4 and 5, the winding means 17 can complete a 360° winding around the shaping member 12, winding around it completely, preferably in correspondence with the first intermediate portion 12*d*.

The winding means 17 intersect the longitudinal axis X dividing ideally into two portions, or branches, 17*a* and 17*b* respectively afferent to the electric motors 18*a* and 18*b*.

The 360° winding causes the winding means 17 to contact the shaping member 12 with a first contact portion 17*c* and with a second contact portion 17*d* opposite the first contact portion 17*c*.

In this way, the branch 17*a* and the branch 17*b* have an offset and parallel direction to each other.

The winding means 17 also comprise a return portion 17*e* positioned substantially parallel to at least one branch 17*a* and 17*b* (FIGS. 2 and 3).

The machine 10 also comprises a command and control unit 29 associated with the electric motors 18*a* and 18*b* and/or with the second drive means 24 in order to control the functioning parameters, such as, for example, the rotation speed (FIG. 1).

Possibly, there can be return elements 28 associated with the winding means 17 to provide for the correct insertion of the latter into one or both of the pulleys 19*a*, 19*b*.

Furthermore, the machine 10 can be disposed downstream with respect to a machine for feeding strip-shaped elements B and upstream with respect to a work machine for working the tubular product A, for example a cutting machine configured to cut the tubular product A transversely to form straws (both not shown).

Some embodiments can provide that the machine 10 is equipped with detection means 30 advantageously positioned in correspondence with the outlet 32 toward, for example, the work machine (FIG. 1).

The detection means 30 can comprise optical sensors, photocells, etc., and can be configured to detect at least the presence of the tubular product A at exit toward the work machine.

In some embodiments, the detection means 30 can be associated with the command and control unit 29 so that the latter can control the electric motors 18*a*, 18*b* and/or the second drive means 24 as a function of the signals supplied by the detection means 30.

In order to describe the advantages of the invention in detail and make the cooperation between the parts that it consists of clear, with the aid of FIGS. 4 and 5 below we will describe the machine 10 when it is in use.

In the paragraphs of the description that follow, the forces F and the tractions T are comprised between values from about 10 N to about 50 N.

As it is known, shaping straws provides to feed a plurality of strip-shaped elements B made of paper onto the shaping member 12 to wind them together in order to produce the tubular product A.

Typically, the strip-shaped elements B are fed substantially in correspondence with the first portion 12*a* of the shaping member 12, while the tubular product A is obtained substantially in correspondence with the second portion 12*b*.

The winding of the strip-shaped elements B made of paper provides that the latter are rotated by driving the electric motors 18*a*, 18*b*, which in turn rotate the winding means 17, which in this embodiment are configured as a belt.

The belt 17 is wound on the shaping member 12 in such a way as to wind around it on the entire circumference, for example enveloping it for an arc of 360°.

In this example configuration, the electric motors 18*a*, 18*b* are driven in such a way as to cause a rotation of the belt 17 in a first direction of rotation R1 and a consequent rotation of the strip-shaped elements B in a second direction of rotation R2.

According to this rotation in the first direction of rotation R1, the main electric motor 18*b* exerts, on the branch 17*b*, a first traction force T1, which has a sense concordant with the direction of rotation R1.

On the contrary, a second traction force T2 acts on the branch 17*a* with a sense opposite the first traction force T1, substantially generated by the resistance provided by the pulley 19*a* connected to the auxiliary electric motor 18*a* which, despite rotating in the first direction of rotation R1, allows to keep the branch 17*a* under tension.

Since the pulling function of the main electric motor 18*b* acts on the branch 17*b*, the first traction force T1 generated by the latter causes a tension in the branch 17*b* which is much greater than the tension caused by the second traction force T2 on the branch 17*a*. Therefore, as a result, the second force F2 is generated which acts on the shaping member 12 substantially in a manner perpendicular with respect to the longitudinal axis X.

According to some embodiments, the third contact portion 22*c* contacts the shaping member 12 on the opposite side with respect to the first contact portion 17*c* relative to the longitudinal axis X or, preferably, with respect to the first work plane P.

As known in the principles of physics, the more the rotation speed of the belt 17 increases, the more the first traction force T1 increases and, consequently, the second force F2 which acts on the shaping member 12 also increases, causing the known flexion phenomena already mentioned which prevent the machine from increasing productivity.

The second support means 20 apply the third force F3, suitable to oppose the force F2 and therefore to limit, or even eliminate, the flexion of the shaping member 12.

Based on what has been described, the second drive means 24 are configured to rotate the support belt 22 with direction and speed concordant with the rotation in the first direction of rotation R1 and substantially at the speed of the belt 17.

Evaluating the system formed by the pulleys 25*a*, 25*b* and the support belt 22, we wish to highlight that the pulley 25*b* exercises, relatively to the branch 22*b*, a drawing function that generates a third traction force T3, concordant with the first direction of rotation R1.

On the contrary, a fourth traction force T4 acts on the branch 22*a*, with a sense opposite the third traction force T3, generated substantially by the resistance supplied by the pulley 25*a*.

The third traction force T3 causes a tension of the branch 22*b* which is much greater than the fourth traction force T4 which acts on the branch 22*a*, generating as a resultant the third force F3 that acts on the shaping member 12 through the third contact portion 22*c*.

According to some embodiments, the first support means 14 and the first contact portion 17*c* in correspondence with which the belt 17 winds the shaping member 12 are separated by a distance D1, which is smaller than a distance D2 which separates the first support means 14 and the third contact portion 22*c*, in correspondence with which the belt 22 winds the shaping member 12.

According to some embodiments, the first and third contact portions 17*c*, 22*c* on which the second and third forces F2, F3 respectively act are distanced by a distance D3 which is kept as small as possible in order to prevent the onset of torque caused by the fact that the second force F2 and the third force F3 act on the shaping member 12 with a certain arm.

The invention also describes a method to produce a tubular product A, preferably made of paper, which can be preferably used to produce straws starting from one or more strip-shaped elements B. The method comprises:

- feeding the one or more strip-shaped elements B, preferably made of paper, onto the shaping member 12,
- winding the one or more strip-shaped elements B around the shaping member 12 by rotating winding means 17 wound around the shaping member 12, applying a determinate first traction force T1. The first traction force T1 generates a first component F1 suitable to wind the one or more strip-shaped elements B and a second component F2 which tends to flex the shaping member 12.

According to one aspect of the invention, the method also comprises supporting, during the winding of the one or more strip-shaped elements B, the shaping member 12 by means of second support means 20 in order to at least partly contrast the second component F2 of the first traction force T1 and keep the shaping member 12 substantially coaxial to the longitudinal axis X, despite the application of the first traction force T1 by the winding means 17.

It is clear that modifications and/or additions of parts and/or steps may be made to the machine and method for producing a tubular product, preferably made of paper, which can be preferably used to produce straws as described heretofore, without departing from the field and scope of the present invention as defined by the claims.

It is also clear that, although the present invention has been described with reference to some specific examples, a person of skill in the art shall certainly be able to achieve many other equivalent forms of machines or methods for producing tubular products, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Machine for producing a tubular product starting from one or more strip-shaped elements, comprising:

a shaping member with a substantially cylindrical oblong shape and which has a longitudinal axis, wherein said shaping member comprises a first portion configured to be directly associated with first support means and a second portion disposed at one free end of said shaping member, on the opposite side with respect to said first support means, said shaping member being configured to allow the winding around it of said one or more strip-shaped elements to produce said tubular product, and winding means configured in a closed loop and partly wound around said shaping member in a first intermediate position of the latter, between said first and second portion, to wind said one or more strip-shaped elements in a helical manner around said shaping member and draw them in a shaping direction, applying a determinate first traction force substantially tangent to said shaping member and inclined by a determinate angle ($\alpha$) with respect to said longitudinal axis, so that said first traction force generates a consequent first component, parallel to said longitudinal axis, suitable to carry out the helical winding of said one or more strip-shaped elements, and a second component, in a direction perpendicular to said longitudinal axis, which tends to flex said shaping member, characterized in that it also comprises second support means comprising a support belt disposed in a closed loop, made of flexible material, only partly wound on the shaping member and configured to support said shaping member in a second intermediate position, positioned downstream of said first intermediate position with respect to the shaping direction of the tubular product, said support belt being configured to apply an additional force on said shaping member, in said second intermediate position, in contrast to said second component of said first traction force, without drawing said one or more strip-shaped elements, so as to keep said shaping member substantially coaxial to said longitudinal axis and at the same time letting said one or more strip-shaped elements slide on said support belt.

2. Machine as in claim 1, characterized in that said support belt is made with a material having a lower friction coefficient than that of the material used to make said winding means.

3. Machine as in claim 1, characterized in that it also comprises first drive means comprising a main electric motor and an auxiliary electric motor, disposed on opposite parts with respect to a first work plane on which said longitudinal axis lies, wherein said main electric motor, possibly assisted by said auxiliary electric motor, is configured to rotate said winding means, wherein with said electric motors there are associated respective pulleys which rotate on corresponding axes of rotation parallel to each other and lying on a plane parallel to a second work plane which orthogonally intersects said first work plane along said longitudinal axis of said shaping member.

4. Machine as in claim 1, characterized in that said additional force has at least one component opposite, in direction and sense, with respect to said second component of said first traction force.

5. Machine as in claim 1, characterized in that said support belt is configured to apply a further traction force substantially tangent to said shaping member and inclined by a determinate angle (β) with respect to said longitudinal axis, which consequently generates said additional force.

6. Machine as in any claim 1, characterized in that said support belt is associated with one or more rotation means which provide one or more rotation points around which said support belt can rotate.

7. Machine as in claim 6, characterized in that said one or more rotation means are positioned in a concordant manner with respect to a first work plane on which said longitudinal axis lies.

8. Machine as in claim 7, characterized in that said one or more rotation means lie on a second work plane.

9. Machine as in claim 6, characterized in that said one or more rotation means are associated with second drive means configured to be rotated.

10. Machine as in claim 9, characterized in that said second drive means are configured to rotate said support belt with direction and speed concordant with the rotation and speed of said winding means.

11. Machine as in claim 1, characterized in that said first and second intermediate positions are distanced by a length which is smaller than the distance between the first support means and a contact portion of the winding means with the shaping member.

12. Machine as in claim 1, characterized in that said winding means comprise a flexible drawing belt, closed in a loop, and having a friction coefficient higher than the friction coefficient of said support belt, said drawing belt being disposed and configured to draw said one or more strip-shaped elements in said shaping direction.

13. Machine as in claim 1, characterized in that the tubular product is made of paper.

14. Machine as in claim 1, characterized in that the tubular product is used to produce straws.

15. Method to produce a tubular product starting from one or more strip-shaped elements, comprising:

feeding one or more strip-shaped elements, in a shaping direction onto a shaping member which has a longitudinal axis, winding said one or more strip-shaped elements around said shaping member by rotating winding means wound on said shaping member to apply a determinate first traction force which generates a first component suitable to wind said one or more strip-shaped elements, and a second component which tends to flex said shaping member, characterized in that it also comprises supporting, during the winding of the one or more strip-shaped elements, said shaping member by means of second support means configured as a support belt disposed in a closed loop, made of flexible material, partly wound on the shaping member to at least partly contrast said second component of said first traction force, said support belt applying an additional force on said shaping member in contrast to said second component of said first traction force, without drawing said one or more strip-shaped elements, so as to keep said shaping member substantially coaxial to said longitudinal axis and at the same time letting said one or more strip-shaped elements slide on said support belt.

16. Method as in claim 15, characterized in that it also comprises rotating said support belt by exerting a friction on said one or more strip-shaped elements smaller than that exerted by said winding means.

17. Method as in claim 15, characterized in that said additional force has at least one component opposite, in direction and sense, with respect to said second force of said first traction force.

18. Method as in claim 15, characterized in that the tubular product is made of paper.

19. Method as in claim 15, characterized in that the tubular product is used to produce straws.

* * * * *